United States Patent
Kularatna et al.

(10) Patent No.: US 9,226,189 B1
(45) Date of Patent: Dec. 29, 2015

(54) MONITORING HEALTH OF A PREDISTORTION SYSTEM

(71) Applicant: Nokia Solutions and Networks Oy, Espoo (FI)

(72) Inventors: Shavantha Kularatna, Flower Mound, TX (US); Christian Reichl, Hirschau (DE); Bjoern Jelonnek, Ulm (DE); Alan Pereira, Irving, TX (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/462,035

(22) Filed: Aug. 18, 2014

(51) Int. Cl.
*H04W 24/10* (2009.01)
*H04B 17/17* (2015.01)

(52) U.S. Cl.
CPC ............... *H04W 24/10* (2013.01); *H04B 17/17* (2015.01)

(58) Field of Classification Search
CPC .............................. H04W 24/10; H04B 17/01
See application file for complete search history.

(56) References Cited

U.S. PATENT DOCUMENTS

| 7,031,687 B2 * | 4/2006 | Kivekas et al. ............... 455/313 |
| 7,123,889 B2 * | 10/2006 | Scheck et al. ............. 455/115.1 |
| 8,467,474 B2 * | 6/2013 | Kenington et al. ........... 375/297 |

OTHER PUBLICATIONS

Lie Ding, "Digital Predistortion of Power Amplifiers for Wireless Applications", Thesis, Georgia Institute of Technology, (2004) (117 pages).
D. Morgan et al., "A Generalized Memory Polynomial Model for Digital Predistortion of RF Power Amplifiers", IEEE Transactions on Signal Processing (vol. 54 , Issue: 10) (2006) (abstract only).
D. Morgan et al., "A Generalized Memory Polynomial Model for Digital Predistortion of RF Power Amplifiers", IEEE Transactions on Signal Processing (vol. 54 , Issue: 10) (2006).

* cited by examiner

*Primary Examiner* — Sophia Vlahos
(74) *Attorney, Agent, or Firm* — Harrington & Smith

(57) ABSTRACT

At a current time, a current intermodulation content of a predistortion system is determined. An intermodulation ratio is determined using the current intermodulation content and a previous intermodulation content for the predistortion system. The previous intermodulation content is determined at a time previous to the current time. The determined intermodulation ratio is compared with stored intermodulation ratios. A warning is communicated in response to the comparing indicating the predistortion system is unhealthy. Apparatus and computer program products are also disclosed.

22 Claims, 6 Drawing Sheets

| IM Ratio | DPD Correction (dB) |
|---|---|
| 1.0 | 30 |
| 2.0 | 32 |
| 4.3 | 34 |
| ⋮ | ⋮ |
| 80 | 6.0 |
| 200 | 4.0 |
| 500 | 2.0 |

← Threshold 510

MONITORING HEALTH OF A PREDISTORTION SYSTEM

TECHNICAL FIELD

This invention relates generally to wireless networks and, more specifically, relates to apparatus that use predistortion such as digital predistortion (DPD) in wireless networks.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, prior to the claims.

Base stations connect wireless devices, called user equipment herein, to wireless networks. Base stations have different names depending on the technology being used. For UTRAN, for instance, the base station is a base transceiver station (BTS) and a NodeB, and a radio network controller (RNC) controls the NodeB. For E-UTRAN, the BTS and NodeB are replaced by an eNB, which also has functionality previously implemented in the RNC. The eNB is the base station for E-UTRAN. The base stations implement transceivers for whatever the air interface is, such as long term evolution (LTE), code division multiple access (CDMA), and the like.

A transceiver contains typically a transmitter and a receiver. The transmitter uses a power amplifier to amplify signals from a low level to a level suitable for transmission over long distances. Power amplifiers produce a non-linear output, which creates distortion such as intermodulation (IM) products in the output. One technique for dealing with the non-linear output is to pre-distort the input to a power amplifier so that the output of the power amplifier is approximately linear over some range of power output. Digital predistortion (DPD) is one commonly used technique to perform this pre-distortion.

Radio units implemented in base stations undergo strict factory tests to rule out typical transceiver impairments. These tests will normally include 3GPP specified intermodulation product results. Even with these tests, multiple radio units are still failing 3GPP specifications in the field.

Unless a customer using the radio units performs specific tests regularly on these units, no one will know of these types of impairments. These tests cost a lot of money to the customer as well as to the manufacturer of the radio units. These costs include sending a technician to the cell site, perhaps decommissioning the radio (e.g., BTS), transmitting waveforms, and observing the produced intermodulation products with a spectrum analyzer.

Added test times will then reduce revenue to the customer, as the radio is offline during the tests. This also may cause an interrupt in service for wireless users in the area. Lastly, it is extremely difficult to take a spectrum analyzer to a site due to its size and most likely the analyzer has to be battery powered if power plugs are not found in the cell site. It would be beneficial to improve upon this.

SUMMARY

This section contains examples of possible implementations and is not meant to be limiting.

An exemplary method includes: determining at a current time a current intermodulation content of a predistortion system; determining an intermodulation ratio using the current intermodulation content and a previous intermodulation content for the predistortion system, the previous intermodulation content determined at a time previous to the current time; comparing the determined intermodulation ratio with stored intermodulation ratios; and communicating a warning in response to the comparing indicating the predistortion system is unhealthy.

An exemplary apparatus includes one or more processors and one or more memories including computer program code. The one or more memories and the computer program code are configured to, with the one or more processors, cause the apparatus to perform at least the following: determining at a current time a current intermodulation content of a predistortion system; determining an intermodulation ratio using the current intermodulation content and a previous intermodulation content for the predistortion system, the previous intermodulation content determined at a time previous to the current time; comparing the determined intermodulation ratio with stored intermodulation ratios; and communicating a warning in response to the comparing indicating the predistortion system is unhealthy.

Another exemplary embodiment is an apparatus comprising: means for determining at a current time a current intermodulation content of a predistortion system; means for determining an intermodulation ratio using the current intermodulation content and a previous intermodulation content for the predistortion system, the previous intermodulation content determined at a time previous to the current time; means for comparing the determined intermodulation ratio with stored intermodulation ratios; and means for communicating a warning in response to the comparing indicating the predistortion system is unhealthy.

An exemplary computer program product includes a computer-readable storage medium bearing computer program code embodied therein for use with a computer. The computer program code includes: code for determining at a current time a current intermodulation content of a predistortion system; code for determining an intermodulation ratio using the current intermodulation content and a previous intermodulation content for the predistortion system, the previous intermodulation content determined at a time previous to the current time; code for comparing the determined intermodulation ratio with stored intermodulation ratios; and code for communicating a warning in response to the comparing indicating the predistortion system is unhealthy.

BRIEF DESCRIPTION OF THE DRAWINGS

In the attached Drawing Figures:

FIG. 5 is an example of a table of points used to determine an IM ratio; and

DETAILED DESCRIPTION OF THE DRAWINGS

As stated above, a problem is that a customer will not know that a particular base station transmitter is faulty, e.g., unless all the base stations in the field are analyzed. Existing mechanisms to do this are also not cost effective due to, for instance, increased labor, equipment and transportation costs (e.g., cell sites are far away).

There are techniques available where Tx (transmit) and corrected Fb (Feedback) wave forms are plotted to see IM correction. For instance, one could use a traditional FFT mechanism, but this requires a designer to interpret the captured data. In addition, an FFT-type method requires RF carrier configuration knowledge to look for degraded IM performance.

The exemplary embodiments herein do not need a viewing of an analysis picture (e.g., such as one produced by a spectrum analyzer) or knowledge of RF carrier configuration. Exemplary embodiments do not require additional equipment or even stopping base station traffic to determine the level of IM products of the base station. Exemplary embodiments do not even require sending a technician to the cell site. Rather, a simple metric threshold or the level of the threshold will determine the health of a DPD system. In an exemplary embodiment, an algorithm could be implemented in software or could be run remotely via scripts and determine the health of a DPD system.

Figure 1:
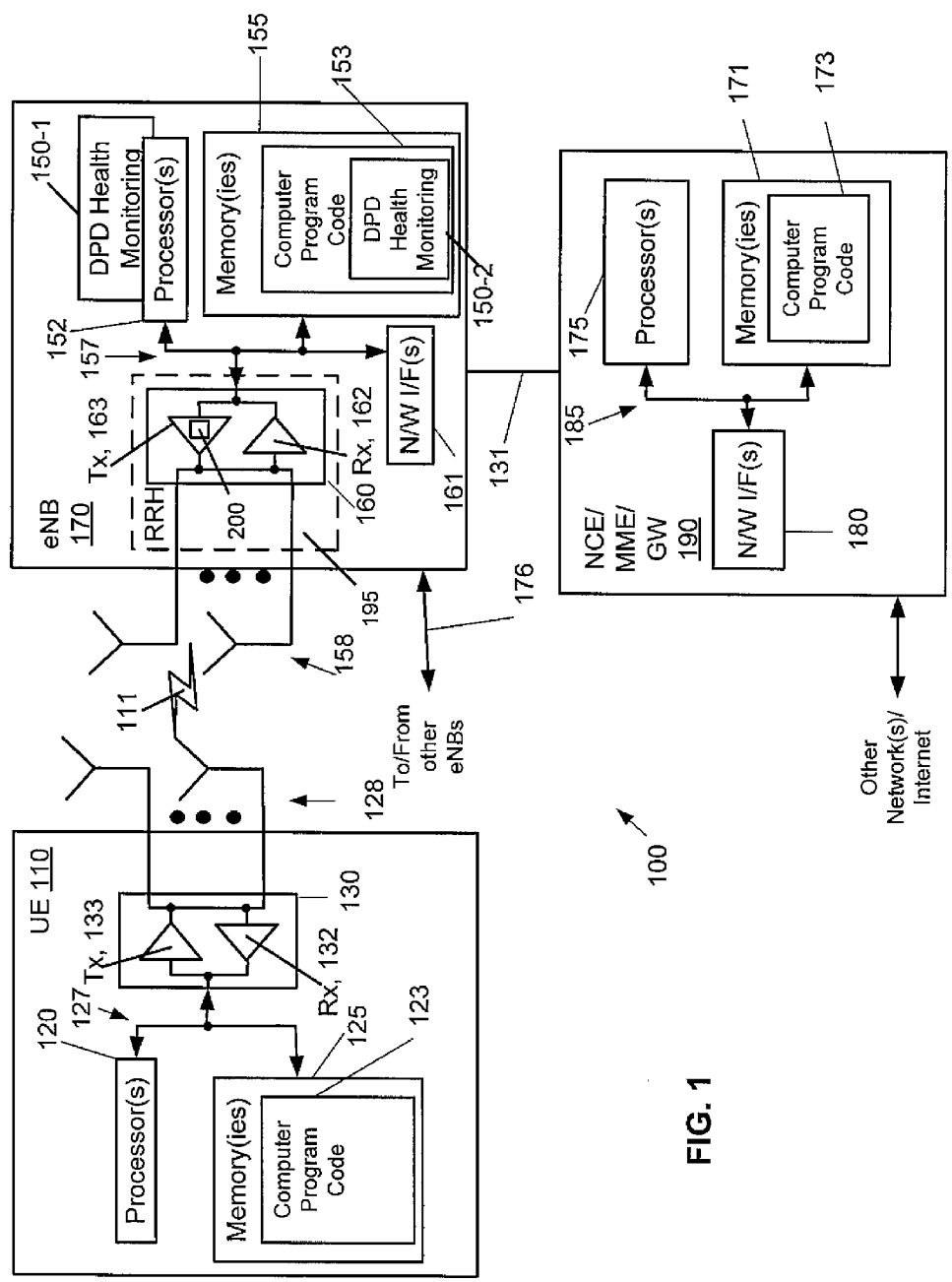
FIG. 1 illustrates an exemplary system in which the exemplary embodiments of the instant invention may be practiced.

Before proceeding with additional description of exemplary embodiments, reference is made to FIG. 1, which shows a block diagram of an exemplary system in which the exemplary embodiments may be practiced. In FIG. 1, a UE 110 is in wireless communication with a wireless network 100. The user equipment 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The one or more memories 125 and the computer program code 123 may be configured to, with the one or more processors 120, cause the user equipment 110 to perform one or more of the operations as described herein. The UE 110 communicates with eNB 170 via a wireless link 111.

The eNB 170 is a base station that provides access by wireless devices such as the UE 11.0 to the wireless network 100. Although an eNB is illustrated, the exemplary embodiments are applicable to other base stations such as BTSs, and to many air interface standards such as LTE, CDMA, GSM, and the like. The eNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The eNB 170 includes a DPD health monitoring module 150, comprising one of or both parts 150-1 and/or 150-2, which may be implemented in a number of ways. The DPD health monitoring module 150 may be implemented in hardware as DPD health monitoring module 150-1, such as being implemented as part of the one or more processors 152. The DPD health monitoring module 150-1 may be implemented also as an integrated circuit or through other hardware such as a programmable gate array. In another example, the DPD health monitoring module 150 may be implemented as DPD health monitoring module 150-2, which is implemented as computer program code 153 and is executed by the one or more processors 152. For instance, the one or more memories 155 and the computer program code 153 are configured to, with the one or more processors 152, cause the eNB 170 to perform one or more of the operations as described herein. The one or more network interfaces 161 communicate over a network such as via the links 176 and 131. Two or more eNBs 170 communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the eNB 170 being physically in a different location from the RRH, and the one or more buses 157 could be implemented in part as fiber optic cable to connect the other elements of the eNB 170 to the RRH 195.

The wireless network 100 may include a network control element (NCE) 190 that may include MME/SGW functionality, and which provides connectivity with a further network, such as a telephone network and/or a data communications network (e.g., the Internet). The eNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented using hardware such as processors 152 or 175 and memories 155 and 171.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples.

FIG. 1 shows that a predistortion system 200 is part of a transmitter 163. The predistortion system 200 is described herein mainly as a "digital" predistortion (DPD) system. However, the techniques herein may be used in analog predistortion, and can be applied as long as the signal going into the predistortion system and feedback signals are digitized for the computations used herein.

Figure 2:
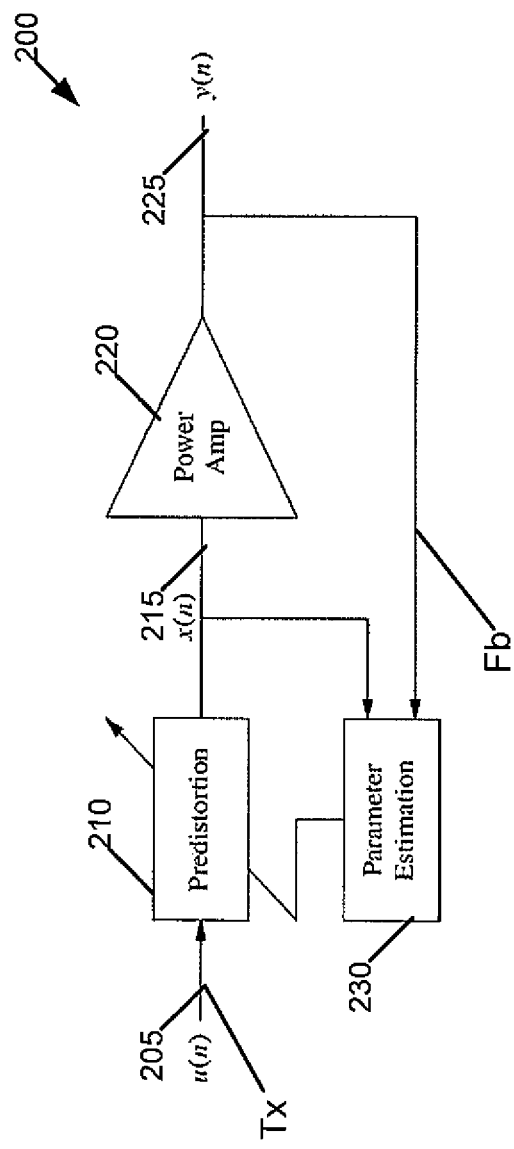
FIG. 2 is an example of a predistortion system as part of a transmitter for a base station shown in FIG. 1, where this figure is a revised version of FIG. 1, entitled "Generic predistortion scheme", from D. Morgan et al., "A Generalized Memory Polynomial Model for Digital Predistortion of RF Power Amplifiers", IEEE Transactions on Signal Processing (Vol. 54, Issue 10) (2006)

One example of a predistortion system 200 is shown in FIG. 2. This figure is a revised version of FIG. 1, entitled "Generic predistortion scheme", from D. Morgan et al., "A Generalized Memory Polynomial Model for Digital Predistortion of RF Power Amplifiers", IEEE Transactions on Signal Processing (Vol. 54, Issue 10) (2006). Additional predistortion circuits are shown and described in, e.g., Lie Ding, "Digital Predistortion of Power Amplifiers for Wireless Applications", Thesis, Georgia Institute of Technology, (2004).

In FIG. 2, the predistortion system 200 comprises a predistortion circuit 210, a power amplifier 220, and a parameter estimation circuit 230. The input waveform (containing input data) is u(n) 205, and the output waveform (containing transformed and amplified data) is y(n) 225. The predistortion circuit 210 applies predistortion to the input u(n) 205 to create a predistorted output x(n) 215. The power amplifier 220 amplifies the predistorted output x(n) to create the output y(n) 225, which is coupled to the one or more antennas 158 for transmission. Note that the waveforms herein may be described as and are typically equivalent to other terminology, such as signals, data, and the like. For consistency, however, effort has been made to refer to such entities as waveforms.

In a typical DPD system 200, the input waveform u(n) is a digital signal, the predistortion provided by the predistortion circuit 210 is performed in a digital domain, and the x(n) would be converted to analog using a digital to analog converter (not shown) prior to the input of the power amplifier 220. The parameter estimation circuit 230 also is typically performed in the digital domain and the feedback Fb signal is converted from analog to digital using an analog to digital converter (not shown).

The exemplary embodiments concern the two waveforms Tx (i.e., x(n) 205) and Fb (i.e., y(n) 225). In an ideal sense, the Fb waveform is closer to the Tx waveform when DPD is working at its best. However, the Fb waveform consists of additional IM products contributed mainly by the PA 220. There is a maximum correlation point (in the time domain) of Tx and Fb waveforms. At this point, both waveforms are said to be synchronized or aligned.

When the waveforms are time-aligned, the Tx waveform (i.e., u(n) 205 in FIG. 2) may be vectorially transformed towards the Fb direction (or vice versa). That is, one can find the projection (or transform) of the Tx waveform, u(n) 205 onto y(n) 225 (the Fb waveform). That projection is Txf. A mean squared error (MSE) may then be determined by subtracting the Fb waveform's autocorrelation from the Txf waveform. In the most ideal case, this difference is very small when DPD corrects the IMs well.

The exemplary embodiments require relatively few sample points of Tx (Transmitter) and Fb (Feedback) waveforms in order to monitor the health of a DPD system such as the predistortion system 200. Most transmitter products for base stations have the ability to acquire these waveforms without any interruption of the operation of the base station. These waveform samples may then be stored in RAM (Random Access Memory)/Flash memory so the exemplary algorithms described below can access the samples.

A list of exemplary waveform samples that may be used is given below.

1) Transmit (Tx) waveform samples. These samples have to be un-predistorted. These samples are accessible at any time with many current ASICs or other integrated circuits. For older ASICs and other devices, a Tx waveform may not be accessible when DPD is enabled. In that situation, an extra step should be invoked to access the un-predistorted Tx waveform.

2) Feedback (Fb) waveform samples are also needed at the current state. These Fb waveform samples have to be obtained around the same time as when step 1) is invoked.

3) Steps 1) and 2) can be performed at the factory or in the field (immediately after carrier configuration) when the BTS is healthy. An exemplary proposed algorithm (see FIG. 4) described below can be run using these healthy Tx and Fb samples. The result, a MSE difference, is then stored in the RAM or flash memory for later use (see below). This MSE difference is normally obtained when Fb performance, with DPD, is at its best. Hence the recommendation is to perform the MSE difference determination at the factory and right after the carriers are configured in the field.

4) Similarly steps 1) and 2) are then performed regularly for a base station where it is possible that the transmitter is broken. Again the MSE difference is calculated. See below for details on how these MSE differences may be used for fault detection.

5) Although the steps above produce two MSE reference points for comparison, these steps could be extended in an R&D setting to build a table. A simple table could comprise the following points:

a) MSE difference at uncorrected state (minimum requirement);

b) MSE difference at fully corrected state (minimum requirement); and c) MSE differences at partially corrected states, such as at 5 dB, 10 dB, 15 dB, 20 dB, . . . , 30 dB, and 35 dB. A DPD system 200 that performs at partially corrected states is considered to be unhealthy.

6) If a table specified in step 5) is built beforehand, then in field correction levels can be predicted by using the MSE difference found in a faulty base station.

Figure 3:
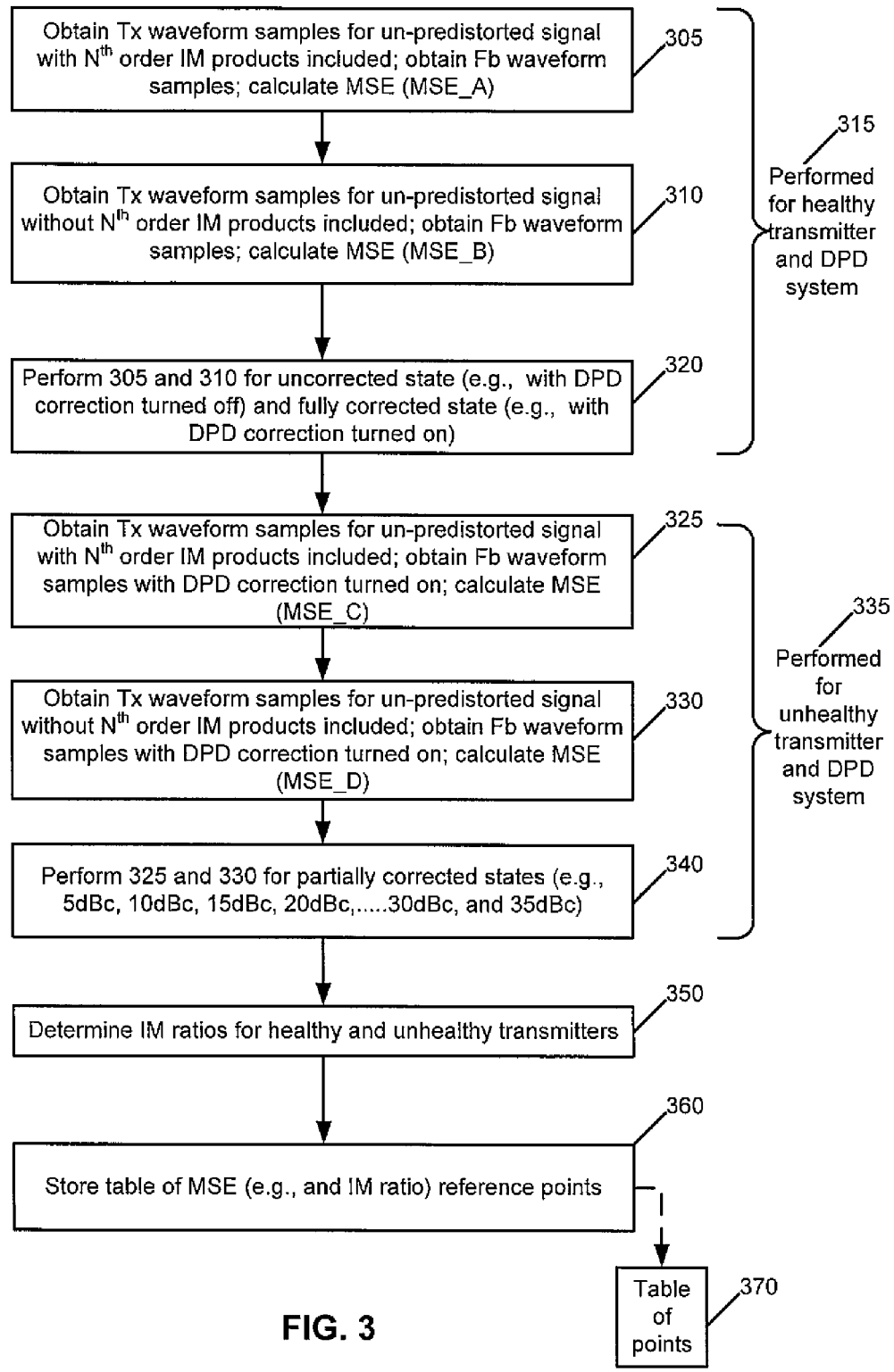
FIG. 3 is performed by an apparatus such as a base station to enable monitoring the health of a DPD system, and is an exemplary logic flow diagram that illustrates the operation of an exemplary method, a result of execution of computer program instructions embodied on a computer readable memory, and/or functions performed by logic implemented in hardware, in accordance with exemplary embodiments herein.

Referring now to FIG. 3, this figure is performed by an apparatus such as a base station 170 to enable monitoring the health of a predistortion system such as a DPD system. This figure is an exemplary logic flow diagram that illustrates the operation of an exemplary method, a result of execution of computer program instructions embodied on a computer readable memory, and/or functions performed by logic implemented in hardware, in accordance with exemplary embodiments herein. The blocks in the figure may be considered to be interconnected means for performing the functions in the blocks. The blocks in FIG. 3 are typically performed in an R&D situation, although it may be performed at least in part in the field, such that a table as described above can be built and subsequently used to determine the health of a predistortion system 200.

In accordance with steps 1), 2), and 3) above, measurements are performed for a healthy transmitter and DPD system 200 (reference 315), and also measurements are performed for an "unhealthy" transmitter and DPD system 200 (reference 335). In this case the "unhealthy" DPD system 200 uses partially corrected states for manually introduced degradation so that a lookup table may be built for this power amplifier.

Regarding the measurements performed for a healthy transmitter and DPD system 200 (reference 315), blocks 305, 310, and 320 are performed. In block 305, the eNB 170 obtains Tx waveform samples for un-predistorted signal with $N^{th}$ order IM products included, obtains Fb waveform samples, and calculates MSE (MSE_A) using the same. As described above, one can find the projection (or transform) of the Tx waveform, u(n) 205 onto y(n) 225 (the Fb waveform). That projection is Txf. Note that the MSE determination is not limited to this technique. MSE determination could be Fb transformed into Tx as well or other techniques. Use of Txf is for example only. A mean squared error (MSE) may then be determined by subtracting the Fb waveform's autocorrelation from the Txf waveform. For each MSE determined herein, this technique may be used. In block 310, the eNB 170 obtains Tx waveform samples for a healthy transmitter including DPD system. In block 310, the eNB 170 obtains Tx waveform samples for un-predistorted signal without $N^{th}$ order IM products included, obtains Fb waveform samples, and calculates MSE (MSE_B) for the same.

In block 320, the eNB 170 performs blocks 305 and 315 for the uncorrected state (e.g., DPD turned off) and fully corrected state (e.g., PD turned on). After block 320 has been performed, the points in a) (MSE difference at uncorrected state) and b) (MSE difference at fully corrected state) above have been determined.

Next, the points in c) (MSE differences at partially corrected states) are determined. Blocks 325-340 determine these points. Reference 335 indicates that blocks 325-340 are performed for an unhealthy transmitter and DPD system 200, e.g., using manually introduced degradation. In block 325, the eNB 170 obtains Tx waveform samples for un-predistorted signal with $N^{th}$ order IM products included, obtains Fb waveform samples with DPD correction turned on, and calculates MSE (MSE_C) using the same. In block 330, the eNB 170 obtain Tx waveform samples for un-predistorted signal without $N^{th}$ order IM products included, obtains Fb waveform samples with DPD correction turned on, and calculates MSE (MSE_D) using the same. The process is continued (block 340) for each of the partially corrected states being used. The example given above uses the partially corrected states of 5 dB, 10 dB, 15 dB, 20 dB, . . . , 30 dB, and 35 dB. However, there can be smaller (or larger) numbers of partially corrected states and the partially corrected states need not be multiples of five and could be, instead, numbers such as 4.3 dB, 13.2 dB, and the like.

In block 350, IM ratios are determined for healthy and unhealthy transmitters. A formula for determining an IM ratio is provided as Equation (1) below. In block 360, a table 370 is stored of MSE (e.g., and IM ratio) reference points. The table 370 may be stored in memory, such as RAM or non-volatile memory (e.g., flash memory), and is used for comparison with transmitters having unknown or questionable health, as described below.

Concerning the flowchart of FIG. 3, full correction means analog or digital predistortion that is working at its best (e.g., is turned on completely). A typical value for this is 30 dB of correction. This depends on the specific PA of the product. Uncorrected means that no analog or digital predistortion is provided. Partially corrected states (block 340) have manually introduced degradation so that one can build a lookup table for this PA. Specific values for partially corrected states are given for information purposes only. It is up to each design to decide values. For example, these values can be in 2 dB steps as opposed to the 5 dB steps in FIG. 3. Interpolation may be used to define a step that is not in the table. For example MSE difference of a broken PA may correspond to 16 dB. However, there may only be 15 and 20 dB lookup table points. So interpolation may be used for determining the exact dB of the broken base station.

Further, a typical case of uncorrected IM is 30 dB down from the carrier (i.e., 30 dBc). So if there is 10 dB of DPD correction, the final IM is 30+10=40 dB down from carrier. If there is 30 dB of DPD correction, then the final IM level is 30+30=60 dB down from the carrier.

It should be noted that PAs can break partially. Hence a broken PA may exhibit IM levels that are 50 dB down from carrier. Now that is 50–30=20 dB. Now when the base station is remote, it is not known how good the IMs are, and instead all there is are the Tx and Fb captures. From this, one computes the IM ratio. If everything works well, the IM ratio should point to 20 dB of correction in the look up table 370. All the corrected states may be DPD correction levels in dB, where 0 dB refers to an un-corrected state (e.g., 30 dB down from carrier). The uncorrected state changes from PA to PA. So this example is a figurative one. In an example, the IM ratio might be determined to be a point in the table. However, if it is determined the IM ratio is between two IM ratio points (for instance IM ratios of 40 and 41) then one could interpolate or choose a point that is closest to one in the table. Interpolation is described above and in more detail below.

Figure 4:
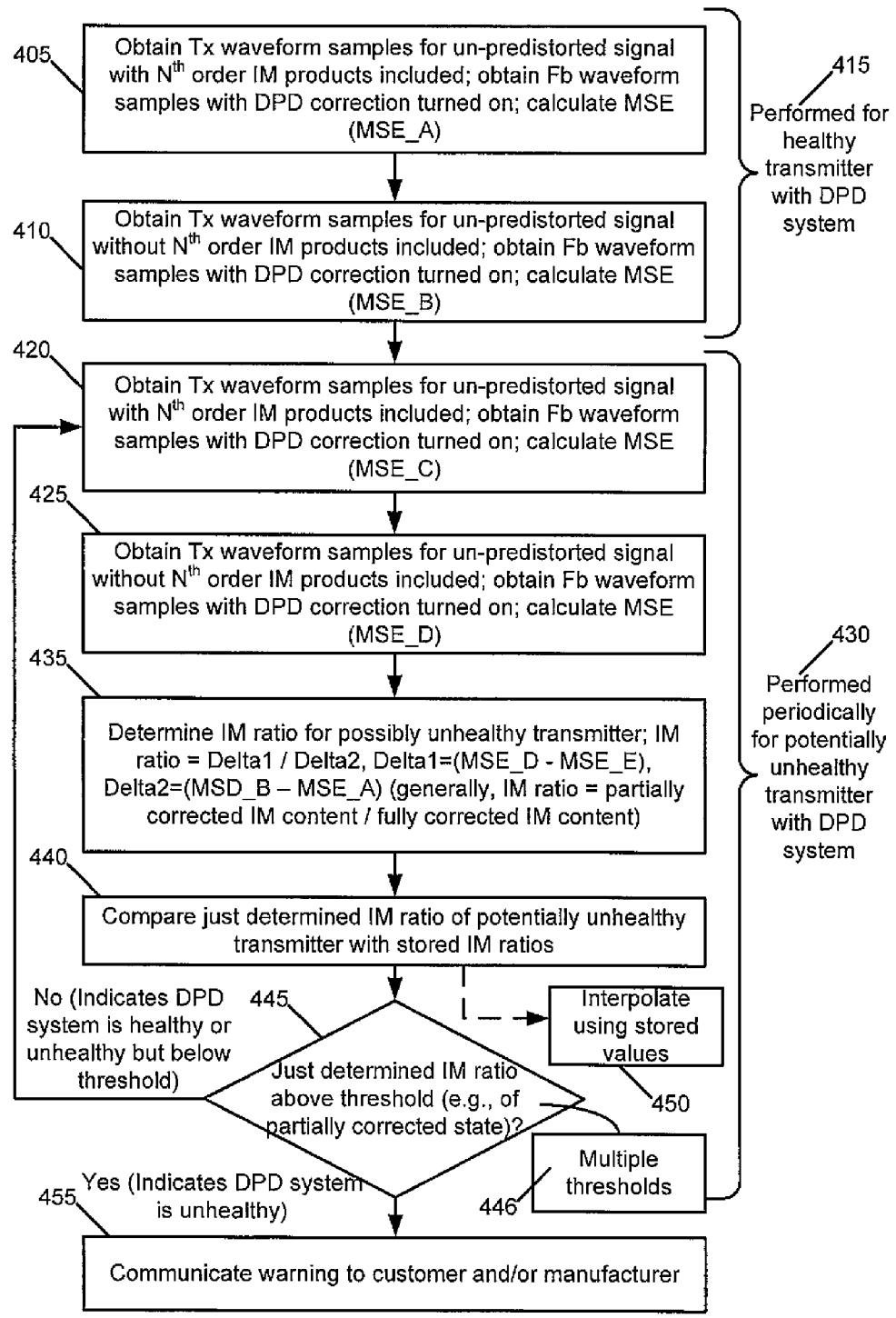
FIG. 4 is performed by an apparatus such as a base station to perform monitoring the health of a DPD system, and is an exemplary logic flow diagram that illustrates the operation of an exemplary method, a result of execution of computer program instructions embodied on a computer readable memory, and/or functions performed by logic implemented in hardware, in accordance with exemplary embodiments herein.

An algorithm is presented below that could be easily incorporated into software (e.g., or hardware). The algorithm is described in reference to FIG. 4, which is performed by an apparatus such as a base station to perform monitoring the health of a predistortion system such as a DPD system 200. FIG. 4 is performed mainly in real time and is used to determine the health of the predistortion system 200. FIG. 4 also is an exemplary logic flow diagram that illustrates the operation of an exemplary method, a result of execution of computer program instructions embodied on a computer readable memory, and/or functions performed by logic implemented in hardware, in accordance with exemplary embodiments herein. The blocks in FIG. 4 may be considered to be interconnected means for performing the functions in the blocks. The algorithm is as follows.

A) Tx and Feedback (Fb) signals are obtained. Tx signal is an un-predistorted signal with $N^{th}$ order IM products included (e.g., N=3, 5, 7 . . . M or a combination of them) with the Tx signal. On the other hand, the Fb waveform is corrected (i.e., digital predistortion is turned on). Calculated MSE for this case is (MSE_A). See block 405. Note that N=3 or N=3, 5, . . . , M, are examples, and this is implementation dependent.

B) The same Tx and Fb samples are used as in A). However, now the Tx waveform does not include the Nth order IM products. Tx is still un-predistorted. Fb is still corrected. Calculated MSE in this case is MSE_B. See block 410. As indicated by reference 415, blocks 405 and 410 are performed for a healthy transmitter with a DPD system. That is, these values should be taken by the eNB 170 as the eNB 170 (or its transmitter) is placed into service or is manufactured.

As indicated by reference 430, blocks 420-445 are performed by the eNB 170 periodically for potentially unhealthy transmitter with the DPD system that may be failing or that may have failed.

C) Tx and Fb waveform samples are obtained when the BTS is partially correcting IMs due to a faulty transceiver. Tx samples are then added with Nth order IM products for correlation. Calculated MSE in this case is MSE_C. See block 420.

D) The same Tx and Fb waveform samples are used (from the faulty or potentially faulty base station) in block 425. However, Nth order IM products are not added to the Tx waveform. Calculated MSE for this case is MSE_D. See block 425.

In block 435, the IM ratio is determined as follows:

$$IM\_Ratio = Delta1/Delta2, \quad (1)$$

where Delta1=(MSE_D−MSE_C) and Delta2=(MSE_B−MSE_A).

It should be noted that generally IM ratio=partially corrected IM content/fully corrected IM content. The formula given above for IM_Ratio is therefore only one example of a formula for determining the IM ratio. Furthermore, although MSE is used herein, MSE is one technique and other techniques may be used. Once the IM_Ratio is computed, the look up table 370 generated at step 5) above can be used to predict estimated IM correction. In good performing base stations, this ratio is very close to 1.0 (e.g., greater than 0.9 less than 2). For faulty units producing the uncorrected IM levels, the IM_ratio may be greater than 100. The magnitude of the ratio used for comparison depends on the transmitted waveform and should be determined during R&D testing. For instance, the IM ratio depends whether N=3 or N=3, 5, . . . , or the like. This is implementation dependent.

In block 440, the eNB 170 compares the just determined IM ratio of the potentially unhealthy transmitter with stored IM ratios (e.g., stored in table 370). In block 445, if the just determined IM ratio is not above a threshold (e.g., of partially corrected state) (block 445=No, which means the DPD system 250 is indicated as being healthy), the method proceeds to block 420, where the eNB 170 waits to perform another periodic set of measurements of Tx and Fb waveforms to determine another IM ratio. For instance, in an example presented above, the IM ratio for a normal transmitter would be stored in the table 370, as would the IM ratios for the partially corrected states. 5 dB, 10 dB, 15 dB, 20 dB, . . . , 30 dB, and 35 dB. The 5 dB value for a partially corrected state might be selected as the threshold. If the just determined IM ratio is below an IM value corresponding to the 5 dB value, block 445 would be No. If the just determined IM ratio has a value that is at or above an IM value corresponding to the 5 dB value, block 445 could be Yes (meaning that the DPD system 250 is indicated as being unhealthy). For instance, an IM ratio of a fully corrected state corresponds to a DPD correction of 30 dB or so. So if one determines an IM ratio with a DPD correction of 25 dB for a remote base station, this base station has degraded but its degradation is tolerable. However, if the correction is computed to be 5 dB, the base station is bad. The base station should be taken out for repair.

A more specific example is illustrated in reference to FIG. 5, which illustrates a table 500 that is a table of reference points similar to the table 370 of FIG. 3. In this example, the threshold 510 is chosen as an IM ratio of 80 and a DPD correction of 6 dB. A determined IM ratio of less than 80 means the corresponding DPD correction is greater than 6.0 dB and therefore the DPD system 200 is assumed to be healthy or unhealthy but below the threshold (block 445=No). A determined IM ratio of 80 or higher means the corresponding DPD correction is 6.0 dB or less and therefore the DPD system 200 is definitely assumed to be unhealthy (block 445=Yes). Note as indicated by block 446, there could be multiple thresholds 510. The one shown in FIG. 5 is for failure of the DPD system, but another threshold could be used for alerting a customer or manufacturer the DPD system 200 is beginning to deteriorate (and therefore is unhealthy) such as an IM ratio of 10 and a corresponding DPD correction of 25 dB.

Additionally, block 450 may be performed as part of block 440. In block 450, the eNB 170 interpolates between values for stored IM ratios. The following is an example of how one might use interpolation. These numbers are hypothetical and the example is merely to aid in understanding. In general this relationship is modulation dependent. For a GSM configuration for instance one might have one table, while for LTE another table might be used. FIG. 5 illustrates a table 500 that is a table of reference points similar to the table 370 of FIG. 3. For ease of description, the table 500 only contains IM ratios, but MSE values may also be used. The table 500 also contains DPD correction values in dB.

To interpolate, one can use a linear interpolation between the two points if approximate accuracy is enough. However, if one wants increased accuracy then one can fit y=f(x) where f(x) is an appropriate polynomial that fits the non-linear relationship between the IM ratio and DPD correction. This is just a polynomial fit on a least square sense, such as $y=a+bx+cx^2+dx^3$ . . . and so on. Generally up to 3rd or 5th orders are sufficient. This should be left to the designer to determine. The y points are taken from DPD correction and the x points are taken from IM ratio points. These polynomial fits are standard routines.

Now if a remote base station determines IM ratio=4.0, the remote base station just plugs in x=4.0 to f(x), which will return DPD correction. This is one technique for using interpolation. As another example, using a linear interpolation and the IM ratio of 4.0, the DPD correction could be 33.7 dB ((4.0−2.0)/(4.3−2.0)=(z−32)/(34−32), solve for "z"). As yet another example, since 4 is closer to 4.3 than to 2.0, 4.3 could be selected and the corresponding DPD correction would be 34 dB.

In response to block 445 being Yes, in block 455, the eNB 170 communicates a warning to the customer and/or manufacturer. Such communication may occur using an email for example. As another possibility, the communication may be effected by setting a flag somewhere, where the flag may be retrieved or accessed by the customer and/or manufacturer.

With these exemplary methods, the operator or manufacturer can determine the correction levels of remote base stations. At the least with large IM ratios, the algorithm is able to determine hardware failure in Tx waveforms.

Figure 6:
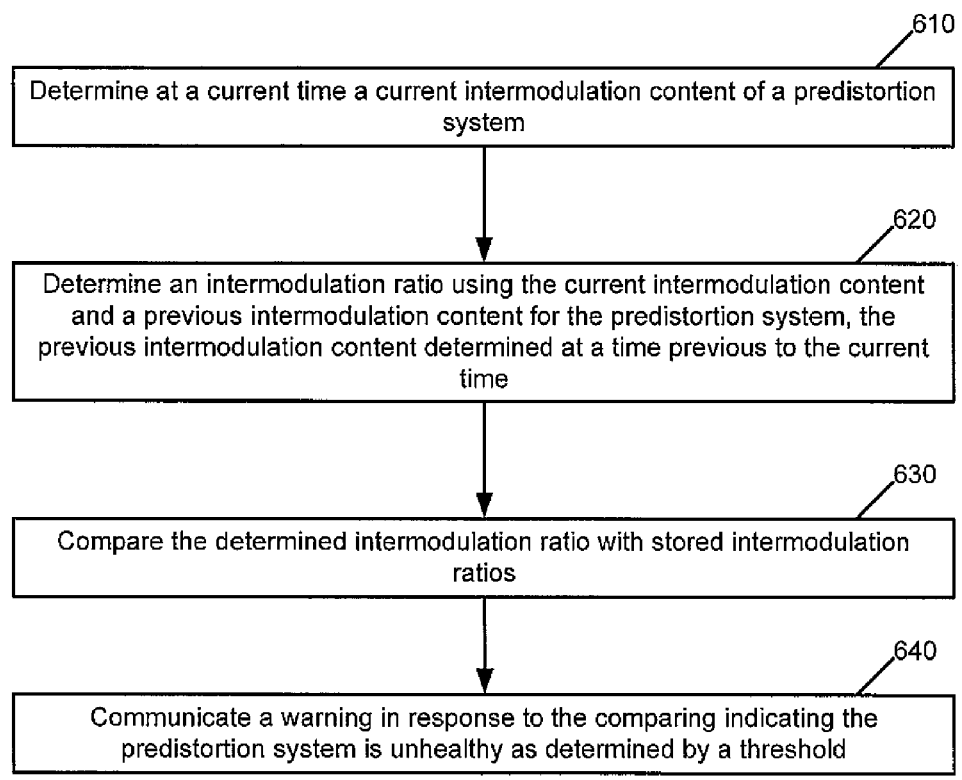
FIG. 6 is performed by an apparatus such as a base station to perform monitoring the health of a DPD system, and is an exemplary logic flow diagram that illustrates the operation of an exemplary method, a result of execution of computer program instructions embodied on a computer readable memory, and/or functions performed by logic implemented in hardware, in accordance with exemplary embodiments herein.

Turning to FIG. 6, this figure is performed by an apparatus such as a base station (e.g., eNB 170) to perform monitoring the health of a DPD system. This figure is an exemplary logic flow diagram that illustrates the operation of an exemplary method, a result of execution of computer program instructions embodied on a computer readable memory, and/or functions performed by logic implemented in hardware, in accordance with exemplary embodiments herein. The blocks in FIG. 6 may be considered to be interconnected means or units for performing the functions in the blocks. For ease of reference, the blocks in FIG. 6 are assumed to be performed by eNB 170, e.g., under control at least in part by the DPD health monitoring module 150. FIG. 6 is also referred to as Example 1 herein.

In block 610, the eNB 170 determines at a current time a current intermodulation content of a predistortion system. In block 620, the eNB 170 determines an intermodulation ratio using the current intermodulation content and a previous intermodulation content for the predistortion system, the previous intermodulation content determined at a time previous to the current time. In block 630, the eNB 170 compares the determined intermodulation ratio with stored intermodulation ratios. In block 640, the eNB 170 communicates a warning in response to the comparing indicating the predistortion system is unhealthy as determined by a threshold.

Additional examples are as follows. Example 2. The method of example 1, wherein determining the current intermodulation content determines the intermodulation content for a predistortion system considered to be potentially unhealthy, and the wherein previous intermodulation content was determined at a time when the predistortion system was considered to be healthy.

Example 3

The method of example 1, wherein determining the current intermodulation content determines the intermodulation content for a predistortion system at a potentially partially corrected state, and the wherein previous intermodulation content was determined at a time when the predistortion system was considered to be at a fully corrected state.

Example 4

The method of example 3, wherein: determining the current intermodulation content further comprises determining the current intermodulation content using transmitted waveforms and feedback waveforms at the potentially partially corrected state; the previous intermodulation content was determined using transmitted waveforms and feedback waveforms at a fully corrected state of the predistortion system; and a transmitted waveform is a signal before the predistortion system and a feedback waveform is a signal from an output of the predistortion system.

Example 5

The method of example 4, wherein: determining the previous intermodulation content is determined by: determining a first difference between a first mean squared error of samples of a feedback waveform created from a transmitted waveform having Nth order intermodulation added thereto and samples of the transmitted waveform having the Nth order intermodulation added thereto; and determining a second difference between a mean squared error of samples of a feedback waveform created from a transmitted waveform without Nth order intermodulation added thereto and samples of the transmitted waveform without the Nth order intermodulation added thereto; and subtracting the first difference from the second difference to determine the previous intermodulation content; and the current intermodulation content is determined by: determining a third difference between a first mean squared error of samples of a feedback waveform created from a transmitted waveform having Nth order intermodulation added thereto and samples of the transmitted waveform having the Nth order intermodulation added thereto; and determining a fourth difference between a mean squared error of samples of a feedback waveform created from a transmitted waveform without Nth order intermodulation added thereto and samples of the transmitted waveform without the Nth order intermodulation added thereto; and subtracting the fourth difference from the third difference to determine the current intermodulation content.

Example 6

The method of example 5, wherein the intermodulation ratio is determined as follows: IM_Ratio=Delta1/Delta2, where IM_Ratio is the intermodulation ratio, where Delta1=(MSE_D−MSE_C), where Delta2=(MSE_B−MSE_A), MSE_D is the fourth difference, MSE_C is the third difference, MSE_B is the second difference, and MSE_A is the first difference.

Example 7

The method of any of the examples above, wherein the stored intermodulation ratios comprise intermodulation ratios taken at a time a predistortion system was known to be healthy.

Example 8

The method of example 7, wherein the stored intermodulation ratios further comprise one or more intermodulation ratios for the predistortion system based on manually introduced degradation for the predistortion system, wherein the manually introduced degradation simulates values of intermodulation ratios for a predistortion system deemed to be unhealthy.

Example 9

The method of any of the examples above, wherein: comparing further comprises determining whether a value of the intermodulation ratio is above a threshold for intermodulation ratio and determining the predistortion system is unhealthy based on the value of the intermodulation ratio being above the threshold.

Example 10

The method of example 9, wherein comparing further comprises determining whether a value of the intermodulation ratio is above a second threshold that is less than the first threshold in terms of values of the intermodulation ratio for the first and second thresholds and determining the predistortion system is unhealthy based on the value of the intermodulation ratio being above the second threshold.

Example 11

A method as in any of the examples above, where the predistortion system is a digital predistortion system. The method as in this paragraph where the predistortion system comprises the elements in FIG. 2.

An apparatus comprising means for performing any of the methods of examples 1-11 above.

An exemplary apparatus includes one or more processors and one or more memories including computer program code. The one or more memories and the computer program code are configured to, with the one or more processors, cause the apparatus to perform any of the methods of examples 1-11 above. The apparatus of this paragraph, further comprising the predistortion system.

A system comprising any of the apparatus described above.

Another exemplary embodiment is a computer program comprising code for performing any of the methods of examples 1-11 above. The computer program according to this paragraph, wherein the computer program is a computer program product comprising a computer-readable medium bearing computer program code embodied therein for use with a computer.

Without in any way limiting the scope, interpretation, or application of the claims appearing below, a technical effect of one or more of the example embodiments disclosed herein is to monitor the health of a DPD system. Another technical effect of one or more of the example embodiments disclosed herein is to determine whether a DPD is operating normally or abnormally. Another technical effect of one or more of the example embodiments disclosed herein is to determine the health of a DPD system remotely, i.e., without a visit to the site of the DPD system.

Exemplary advantages include one or more of the following non-limiting examples:

A) No Cell site visits are necessary to determine a faulty Tx exhibiting large IMs.

B) No equipment is required to determine Tx IM failures.

C) Certain exemplary embodiments save time by incorporating the algorithm in software or when not implemented in software remote scripts can incorporate the monitoring.

D) Exemplary embodiments can determine the level of IM correction.

E) Unlike other methods, this novel idea does not require knowledge of the carrier configuration of the radio.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memory 125, 155, and/or 171 or other device) that may be any media or means that can contain or store the instructions for use by or in connection with an instruction execution system, apparatus, or device, such as a computer. A computer-readable storage medium does not encompass propagating signals, however.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following are abbreviations that may be found in the specification and/or the drawing figures.

3GPP Third Generation Partnership Project
ASIC Application Specific Integrated Circuit
BTS Base Transceiver Station
CDMA Code Division Multiple Access
dB decibels
dBc decibels relative to the carrier, which is the power ratio of a signal to a carrier signal, expressed in decibels
DL downlink (from base station to user equipment)
DPD Digital Predistortion
eNB or eNode B evolved Node B (e.g., LTE base station)
E-UTRAN Evolved UTRAN
Fb Feedback
FFT fast Fourier transform
GSM Global System for Mobile Communications
GW Gateway
IM Intermodulation
LTE Long Term Evolution.
NCE Network Control Entity
MME Mobility Management Entity
PA Power Amplifier
R&D Research and Development
RAM Random Access Memory
RAN Radio Access Network
RF Radio Frequency
RNC Radio Network Controller
Rx receiving or receiver
Tx transmitting or transmitter
UE User Equipment (e.g., a wireless device)
UTRAN Universal Terrestrial Radio Access Network

What is claimed is:

1. A method, comprising:
   determining at a current time a current intermodulation content of a predistortion system;
   determining an intermodulation ratio using the current intermodulation content and a previous intermodulation content for the predistortion system, the previous intermodulation content determined at a time previous to the current time;
   comparing the determined intermodulation ratio with stored intermodulation ratios; and
   communicating a warning in response to the comparing indicating the predistortion system is unhealthy.

2. The method of claim 1, wherein determining the current intermodulation content determines the intermodulation content for a predistortion system considered to be potentially unhealthy, and the wherein previous intermodulation content was determined at a time when the predistortion system was considered to be healthy.

3. The method of claim 1, wherein determining the current intermodulation content determines the intermodulation content for a predistortion system at a potentially partially corrected state, and the wherein previous intermodulation content was determined at a time when the predistortion system was considered to be at a fully corrected state.

4. The method of claim 3, wherein:
   determining the current intermodulation content further comprises determining the current intermodulation content using transmitted waveforms and feedback waveforms at the potentially partially corrected state;
   the previous intermodulation content was determined using transmitted waveforms and feedback waveforms at a fully corrected state of the predistortion system; and
   a transmitted waveform is a signal before the predistortion system and a feedback waveform is a signal from an output of the predistortion system.

5. The method of claim 4, wherein:
  determining the previous intermodulation content is determined by:
    determining a first difference between a first mean squared error of samples of a feedback waveform created from a transmitted waveform having $N^{th}$ order intermodulation added thereto and samples of the transmitted waveform having the $N^{th}$ order intermodulation added thereto; and
    determining a second difference between a mean squared error of samples of a feedback waveform created from a transmitted waveform without $N^{th}$ order intermodulation added thereto and samples of the transmitted waveform without the $N^{th}$ order intermodulation added thereto; and
    subtracting the first difference from the second difference to determine the previous intermodulation content; and
  the current intermodulation content is determined by:
    determining a third difference between a first mean squared error of samples of a feedback waveform created from a transmitted waveform having $N^{th}$ order intermodulation added thereto and samples of the transmitted waveform having the $N^{th}$ order intermodulation added thereto; and
    determining a fourth difference between a mean squared error of samples of a feedback waveform created from a transmitted waveform without $N^{th}$ order intermodulation added thereto and samples of the transmitted waveform without the $N^{th}$ order intermodulation added thereto; and
    subtracting the fourth difference from the third difference to determine the current intermodulation content.

6. The method of claim 5, wherein the intermodulation ratio is determined as follows:
  IM_Ratio=Delta1/Delta2, where IM_Ratio is the intermodulation ratio, where Delta1=(MSE_D−MSE_C), where Delta2=(MSE_B−MSE_A), MSE_D is the fourth difference, MSE_C is the third difference, MSE_B is the second difference, and MSE_A is the first difference.

7. The method of claim 1, wherein the stored intermodulation ratios comprise intermodulation ratios taken at a time a predistortion system was known to be healthy.

8. The method of claim 7, wherein the stored intermodulation ratios further comprise one or more intermodulation ratios for the predistortion system based on manually introduced degradation for the predistortion system, wherein the manually introduced degradation simulates values of intermodulation ratios for a predistortion system deemed to be unhealthy.

9. The method of claim 1, wherein:
  comparing further comprises determining whether a value of the intermodulation ratio is above a threshold for intermodulation ratio and determining the predistortion system is unhealthy based on the value of the intermodulation ratio being above the threshold.

10. The method of claim 9, wherein comparing further comprises determining whether a value of the intermodulation ratio is above a second threshold that is less than the first threshold in terms of values of the intermodulation ratio for the first and second thresholds and determining the predistortion system is unhealthy based on the value of the intermodulation ratio being above the second threshold.

11. An apparatus, comprising:
  one or more processors; and
  one or more memories including computer program code,
  the one or more memories and the computer program code configured, with the one or more processors, to cause the apparatus to perform at least the following:
  determining at a current time a current intermodulation content of a predistortion system;
  determining an intermodulation ratio using the current intermodulation content and a previous intermodulation content for the predistortion system, the previous intermodulation content determined at a time previous to the current time;
  comparing the determined intermodulation ratio with stored intermodulation ratios; and
  communicating a warning in response to the comparing indicating the predistortion system is unhealthy.

12. The apparatus of claim 11, wherein determining the current intermodulation content determines the intermodulation content for a predistortion system considered to be potentially unhealthy, and the wherein previous intermodulation content was determined at a time when the predistortion system was considered to be healthy.

13. The apparatus of claim 11, wherein determining the current intermodulation content determines the intermodulation content for a predistortion system at a potentially partially corrected state, and the wherein previous intermodulation content was determined at a time when the predistortion system was considered to be at a fully corrected state.

14. The apparatus of claim 13, wherein:
  determining the current intermodulation content further comprises determining the current intermodulation content using transmitted waveforms and feedback waveforms at the potentially partially corrected state;
  the previous intermodulation content was determined using transmitted waveforms and feedback waveforms at a fully corrected state of the predistortion system; and
  a transmitted waveform is a signal before the predistortion system and a feedback waveform is a signal from an output of the predistortion system.

15. The apparatus of claim 14, wherein:
  determining the previous intermodulation content is determined by:
    determining a first difference between a first mean squared error of samples of a feedback waveform created from a transmitted waveform having Nth order intermodulation added thereto and samples of the transmitted waveform having the Nth order intermodulation added thereto; and
    determining a second difference between a mean squared error of samples of a feedback waveform created from a transmitted waveform without Nth order intermodulation added thereto and samples of the transmitted waveform without the Nth order intermodulation added thereto; and
    subtracting the first difference from the second difference to determine the previous intermodulation content; and
  the current intermodulation content is determined by:
    determining a third difference between a first mean squared error of samples of a feedback waveform created from a transmitted waveform having Nth order intermodulation added thereto and samples of the transmitted waveform having the Nth order intermodulation added thereto; and
    determining a fourth difference between a mean squared error of samples of a feedback waveform created from a transmitted waveform without Nth order intermodulation added thereto and samples of the transmitted waveform without the Nth order intermodulation added thereto; and subtracting the fourth difference from the third difference to determine the current intermodulation content.

16. The apparatus of claim 15, wherein the intermodulation ratio is determined as follows:

IM_Ratio=Delta1/Delta2, where IM_Ratio is the intermodulation ratio, where Delta1=(MSE_D−MSE_C), where Delta2=(MSE_B−MSE_A), MSE_D is the fourth difference, MSE_C is the third difference, MSE_B is the second difference, and MSE_A is the first difference.

17. The apparatus of claim 11, wherein the stored intermodulation ratios comprise intermodulation ratios taken at a time a predistortion system was known to be healthy.

18. The apparatus of claim 17, wherein the stored intermodulation ratios further comprise one or more intermodulation ratios for the predistortion system based on manually introduced degradation for the predistortion system, wherein the manually introduced degradation simulates values of intermodulation ratios for a predistortion system deemed to be unhealthy.

19. The apparatus of claim 11, wherein:

comparing further comprises determining whether a value of the intermodulation ratio is above a threshold and determining the predistortion system is unhealthy based on the value of the intermodulation ratio being above the threshold.

20. The apparatus of claim 19, wherein comparing further comprises determining whether a value of the intermodulation ratio is above a second threshold that is less than the first threshold in terms of values of the intermodulation ratio for the first and second thresholds and determining the predistortion system is unhealthy based on the value of the intermodulation ratio being above the second threshold.

21. The apparatus of claim 11, further comprising a transmitter comprising the predistortion system.

22. A computer program product comprising a computer-readable storage medium bearing computer program code embodied therein for use with a computer, the computer program code comprising:

code for determining at a current time a current intermodulation content of a predistortion system;

code for determining an intermodulation ratio using the current intermodulation content and a previous intermodulation content for the predistortion system, the previous intermodulation content determined at a time previous to the current time;

code for comparing the determined intermodulation ratio with stored intermodulation ratios; and code for communicating a warning in response to the comparing indicating the predistortion system is unhealthy.

* * * * *